Figure 1:
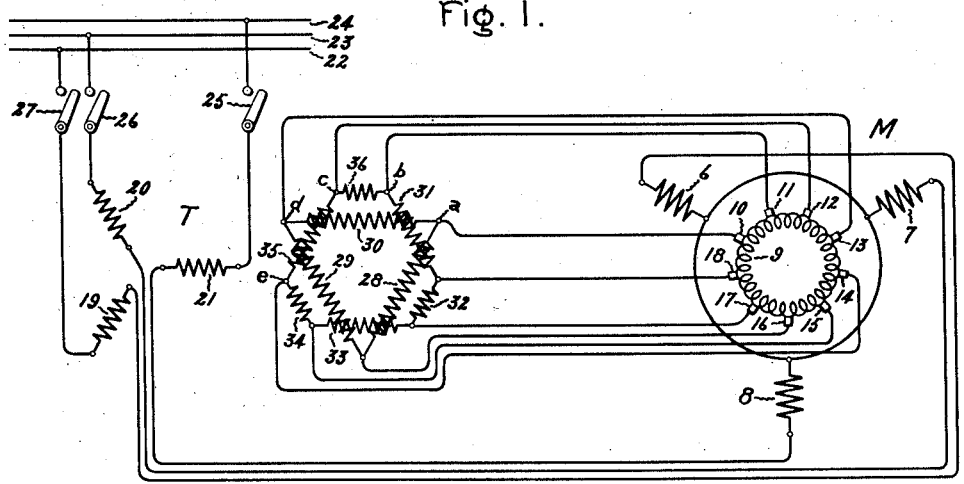

W. C. KORTHALS-ALTES.
ALTERNATING CURRENT MOTOR.
APPLICATION FILED APR. 30, 1918.

1,347,783.

Patented July 27, 1920.

Inventor:
Willem C. Korthals-Altes,
by
His Attorney.

UNITED STATES PATENT OFFICE.

WILLEM C. KORTHALS-ALTES, OF SCHENECTADY, NEW YORK, ASSIGNOR TO GENERAL ELECTRIC COMPANY, A CORPORATION OF NEW YORK.

ALTERNATING-CURRENT MOTOR.

1,347,783.  Specification of Letters Patent.  Patented July 27, 1920.

Application filed April 30, 1918. Serial No. 231,597.

*To all whom it may concern:*

Be it known that I, WILLEM C. KORTHALS-ALTES, a subject of the Queen of the Netherlands, residing at Schenectady, in the county of Schenectady, State of New York, have invented certain new and useful Improvements in Alternating-Current Motors, of which the following is a specification.

This invention relates to alternating current dynamo electric machines, particularly to alternating current commutator motors, and has for its object the provision of novel and effective means for supplying nine phase current to or delivering nine phase current from such a machine.

It is well known in the design of alternating current commutator dynamo-electric machines that it is desirable to use a large number of brush studs about the commutator in order that the copper of the commutator may be economically utilized.

In accomplishing this end in connection with three phase commutator machines, it has been proposed to multiply the number of phases impressed across the commutator by means of phase multiplying transformers; three-nine phase and three-twelve phase transformers which are known to the art, being used for this purpose.

Now the most economical arrangement for utilizing the copper of the commutator is to have the brush studs spaced around the commutator at equi-distances and as near together as is mechanically possible. This can be done by using nine phases, *i. e.* nine studs for every two poles on 25 cycle motors. On 50 and 60 cycle motors the brush-holders incident to the use of nine phases would be too close together, if nine studs were used for every two poles as long as practically safe values for the peripheral speed of the commutator are not exceeded. In such case, however, it becomes advantageous to omit every other stud. This can be done if we have a series wound armature or a multiple armature with equalizers for every commutator bar.

The twelve-phase arrangement, on the other hand, is not as advantageous as the nine phase arrangement because the number 9 has only the factor 3 whereas the number 12 has the factors 2, 3, 4 and 6. Consequently by using a nine phase transformer we can get a symmetrical spacing of the brush studs by omitting every other one, because 9 is not divisible by 2, an integral number of times, and is hence adapted for use where the number of pairs of poles is two or any multiple thereof while with the twelve phase arrangement a symmetrical arrangement is possible only for five pole pairs or with $\frac{1}{5}$ times the full number of brush studs. The main difficulty with the use of a nine phase transformer, is, however, that unless special precautions are taken, the ordinary practice leads to an uneconomical transformer.

In carrying my invention into effect I have combined a three phase commutator machine with a three-nine phase transformer (the word "transformer" being used hereinafter to denote not only one having distinct primary and secondary windings but to include auto-transformers and other inductive windings) and I have arranged such transformer relatively in a novel manner so as to give a desired voltage across the brushes and avoid the losses heretofore incident to nine phase transformers.

Figure 2:
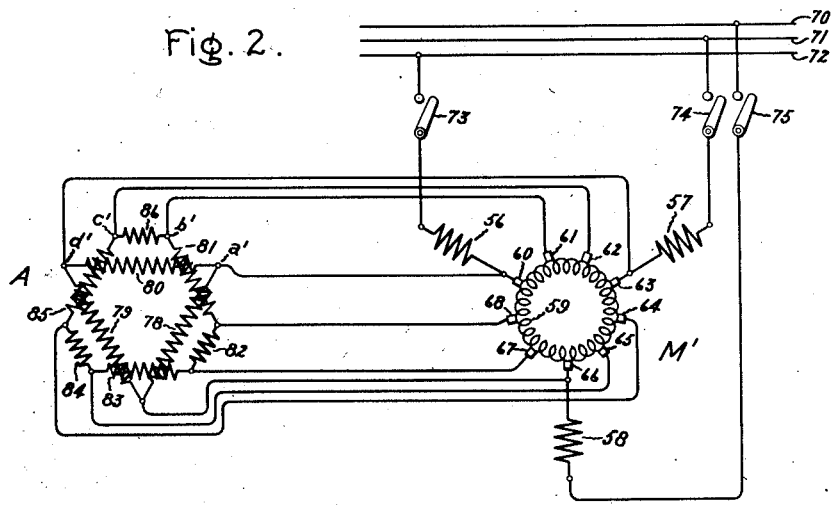

For a more complete understanding of the nature and objects of my invention reference should be had to the following detailed description when taken in connection with the accompanying drawing in which Figure 1 shows, in diagrammatic fashion, a three-phase commutator motor connected with a phase-multiplying transformer in accordance with my invention; and Fig. 2 shows, in like fashion, a three-phase commutator motor connected with an auto-transformer or compensator.

Referring now to Fig. 1, M indicates diagrammatically a commutator motor having three-phase stator windings 6, 7, 8, a commutated rotor winding 9 and nine coöperating brushes 10, 11, 12, 13, 14, 15, 16, 17 and 18.

The stator windings 6, 7, 8 are shown as connected in star and in series with the primary windings 19, 20, 21 of the transformer T. The primary windings 19, 20, 21 are connected to a three-phase source of electric energy 22, 23, 24; the supply of energy being controlled by switches indicated at 25, 26 and 27.

The secondary windings of the transformer T are designed to yield nine phases. I will now describe the arrangement of transformer windings which I have found particularly economical to use in this connection.

The transformer shown at T comprises two groups of mesh connected secondary windings 28, 29, 30 and 31, 32, 33, 34, 35, 36 which are inductively related to the primary windings 19, 20 and 21. These two groups are so arranged that the relative phase displacement necessary for the nine phases desired exists between each pair of terminals, for instance one phase may be taken off from the terminals $a$ and $b$, the former terminal being shown as connected to windings 28 and 30, and the latter to windings 31 and 36. The other phases are taken from the terminals $b$, $c$ and $c$, $d$, etc.

The number of turns in each of these secondary windings are so proportioned that voltages of substantially equal value may be had in each of the nine phases; for example, this arrangement requires that there be substantially twice as many turns in the windings 31, 33, 35 as in the windings 32, 34, 36 and that there shall be substantially two and one-half times as many turns in the windings 28, 29, 30 as in the windings 32, 34, 36, which permits the use of a very small number of turns in the windings 32, 34 and 36; giving a desirably small potential across the brushes, smaller in fact than is possible with any other arrangement.

In some instances I have constructed the secondary windings so that windings 32, 34 and 36 consist of but two turns each. Consequently I use a relatively larger flux in the core surrounded by these windings to induce the necessary potential across the terminals of the windings than has heretofore been used, resulting in a smaller transformer, and in greater efficiency.

In this arrangement there is no phase displacement of the currents traversing the nine windings, there are only the three original time phases in these windings. Consequently it is advantageous to arrange both the primary and secondary windings on three legs of a transformer core. The windings 28, 32 and 35 are indicated as having currents in phase with primary winding 19. All four windings would consequently be arranged on one leg of the core, the windings 29, 31 and 34 being similarly arranged on another leg with primary winding 20 and windings 30, 33 and 36 being arranged on the third leg with primary winding 21. The secondary windings on the transformer legs fall accordingly into three groups; the group having the most numerous turns, being windings 28, 29 and 30 which are connected delta; the other two groups each having less turns than the first group comprise large and small winding groups which have their ratio of turns as one is to two and are connected in hexagon as indicated, in the drawing, in such wise that the large and small windings are alternately joined together.

The nine brushes 10, 11, 12, 13, 14, 15, 16, 17, 18 which I have shown are then connected to the nine terminals $a$, $b$, $c$, $d$, etc., respectively of the secondary windings of transformer T.

It will be obvious that while I have shown my invention as applied to a series motor at M, it is equally applicable to a shunt motor.

In the embodiment of my invention shown in Fig. 2, I have diagrammatically indicated a motor at $M^1$ having stator windings 56, 57, 58 conductively related to the commuted winding 59 through the brushes 60, 63, 66 of the group of nine brushes 60 to 68 which coöperate with the winding 59.

The stator windings 56, 57, 58 are shown as connected to the three-phase source of electric energy 70, 71, 72; the supply of energy being controlled by switches indicated at 73, 74, 75.

In this form of my invention the nine brushes are connected to the nine terminals $a^1$, $b^1$, $c^1$, $d^1$, etc., respectively of the inductive windings indicated at A.

In order to secure the advantages inherent in the nine phase arrangement above described, I arrange the inductive windings at A on a core of magnetic material in substantially the same manner as the secondary windings of the transformer T. The inductive windings at A are consequently arranged in two mesh connected groups 78, 79, 80 and 81 to 86, respectively, in which the number of turns are proportioned in substantially the same ratios as above described for the transformer T so that substantially equal voltages are obtained across each pair of terminals of the windings A. These inductive windings, when connected to the brushes of the motor $M^1$ as shown, serve as a compensator for the rotor current.

While I have here shown two embodiments of my invention which are, at present, the best means known to me for carrying the same into effect, I would have it understood that this is merely illustrative and that I do not mean to be limited thereby to the precise details here disclosed since obvious alterations thereof will appear to those skilled in this art, nor in the choice of recognized equivalents except as defined in my claims hereunto annexed.

What I claim as new and desire to secure by Letters Patent of the United States, is:—

1. The combination with an alternating current dynamo electric machine of a transformer having one of its windings provided with nine terminals and connected to corresponding terminals of said dynamo electric machine, said winding comprising two groups of mesh connected windings, one group consisting of six windings having windings of alternate large and small numbers of turns, the ratio of the large number of turns to the small number being substantially as two to one, the other group consisting of three windings having equal numbers of turns the ratio of the last said number to the smaller number of turns in the six winding group being substantially as two and one-half to one.

2. The combination with a three-phase alternating current motor having stator windings, a commutated rotor winding and coöperating brushes; of a transformer having phase multiplying secondary windings arranged in two mesh connected groups, one group having three windings and the other six, the ratio of alternate large and small windings in the six winding group being substantially as two to one and the ratio between each winding of the three winding group and a small winding of the six winding group being substantially as two and one-half to one, said secondary windings having nine terminals which are connected in series with said brushes.

3. The combination with a three-phase alternating current commutator motor, of means for supplying the commutated windings of said motor with nine-phase current comprising a three-phase transformer having two secondary windings, one of which is connected in delta and the other in hexagon, three of the sides of the hexagon being substantially equal to each other and the other three sides of the hexagon being of substantially one-half the length of the other sides and each connected between two of the sides of greater length, the number of turns in the hexagon-connected winding being such that the potential between the ends of an adjacent long and short winding is substantially equal to the potential across one phase of the delta-connected winding, the secondary winding for each phase of the three-phase transformer comprising a winding forming one side of the delta-connected winding, a winding forming one long side and a winding forming one short side of the hexagon-connected winding.

In witness whereof, I have hereunto set my hand this 29th day of April, 1918.

WILLEM C. KORTHALS-ALTES.